US008345609B2

(12) United States Patent
Patil et al.

(10) Patent No.: US 8,345,609 B2
(45) Date of Patent: Jan. 1, 2013

(54) SYSTEM, APPARATUS AND METHOD FOR PROACTIVELY RE-ASSESSING THE AVAILABILITY AND QUALITY OF SURROUNDING CHANNELS FOR INFRASTRUCTURE OPERATION IN WIRELESS MESH NODES

(75) Inventors: Abhishek Patil, San Diego, CA (US); Xiangpeng Jing, San Diego, CA (US); Aixin Liu, San Diego, CA (US); Djung N. Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 458 days.

(21) Appl. No.: 12/535,595

(22) Filed: Aug. 4, 2009

(65) Prior Publication Data

US 2011/0032883 A1 Feb. 10, 2011

(51) Int. Cl.
*H04W 72/12* (2009.01)
(52) U.S. Cl. .......................................... 370/329; 370/458
(58) Field of Classification Search ................... 370/329
See application file for complete search history.

(56) References Cited

U.S. PATENT DOCUMENTS

| 7,164,658 | B1 | 1/2007 | Shenoy et al. |
| 7,835,301 | B1 | 11/2010 | Maufer |
| 7,961,674 | B2 | 6/2011 | Jing et al. |
| 8,014,804 | B2 | 9/2011 | Banerjea |
| 8,023,465 | B2 | 9/2011 | Prehofer |
| 2004/0125776 | A1 | 7/2004 | Haugli et al. |
| 2006/0098606 | A1 | 5/2006 | Pandey et al. |
| 2006/0142004 | A1 | 6/2006 | He et al. |
| 2007/0019598 | A1 | 1/2007 | Prehofer |
| 2007/0104215 | A1* | 5/2007 | Wang et al. .................... 370/458 |

(Continued)

FOREIGN PATENT DOCUMENTS

EP 1696689 8/2006

(Continued)

OTHER PUBLICATIONS

Raju et al., BOOST: A BOOtSTrapping Protocol for 802.11-based Self-Organizing Hierarchial Wireless Ad-Hoc Networks, http://www.winlab.rutgers.edu/~sachin/papers/BOOST.pdf, 2003.

(Continued)

*Primary Examiner* — Sulaiman Nooristany
(74) *Attorney, Agent, or Firm* — Blakely, Sokoloff, Taylor & Zafman LLP (57) ABSTRACT

An embodiment of the invention involves a method for selecting an infrastructure mode wireless channel for a tier-2 wireless node of a plurality of wireless nodes forming a wireless mesh network. The method comprises a first operation of receiving information from at least one neighboring node. Then, the first wireless node determines if a collision has occurred with the at least one neighboring node, where the collision is an overlapping of wireless channels selected by the first node and the at least one neighboring node. If a collision has occurred, the first wireless node compares its network degree, iterative count, and MAC address (progressively in that order) with that of its neighboring node to determine which of the first wireless node or the at least one neighboring node is responsible for re-selecting a different wireless channel from a set of non-overlapping wireless channels that are available to the wireless mesh network. Other embodiments are described and claimed.

18 Claims, 9 Drawing Sheets

U.S. PATENT DOCUMENTS

| | | | |
|---|---|---|---|
| 2008/0002607 A1 | 1/2008 | Nagarajan et al. | |
| 2008/0192696 A1 | 8/2008 | Sachs et al. | |
| 2008/0205345 A1 | 8/2008 | Sachs et al. | |
| 2008/0267407 A1 | 10/2008 | Vanderveen | |
| 2008/0310342 A1 | 12/2008 | Kruys et al. | |
| 2009/0221287 A1 | 9/2009 | Balasubramanian et al. | |
| 2010/0188971 A1 | 7/2010 | Chiang | |
| 2011/0032842 A1 | 2/2011 | Patil et al. | |
| 2011/0032913 A1* | 2/2011 | Patil et al. | 370/338 |
| 2011/0075586 A1* | 3/2011 | Hu et al. | 370/252 |

FOREIGN PATENT DOCUMENTS

| | | |
|---|---|---|
| WO | WO 2006-047065 | 5/2006 |
| WO | WO 2006107701 | 10/2006 |
| WO | WO 2007-092931 | 8/2007 |
| WO | WO 2008/029411 | 3/2008 |
| WO | WO 2008/105771 | 9/2008 |

OTHER PUBLICATIONS

Nicholson, et al. "Improved Access Point Selection", http://www.usenix.org/events/mobisys06/full_papers/p233-nicholson.pdf, 2006.

International Application No. PCT/US2010/044440, International Search Report, mailed Feb. 25, 2011.

International Application No. PCT/US2010/044169, International Search Report, mailed Feb. 28, 2011.

International Application No. PCT/US2010/044171, International Search Report, mailed Feb. 9, 2011.

S. Sharma et al., "Dynamic Channel Assignment Protocols for Mobile Networks", Journal of Mobile Communication, vol. 1, Issue 2, 2007, See pp. 70-43.

A. Nasipuri et al., "Multichannel CSMA with Signal Power-based Channel Selection for Multihop Wireless Networks", IEEE VTS, Sep. 2000, See the whole document.

I. Wormsbecker et al., "On Channel Selection Strategies for Multi-channel MAC Protocols in Wireless Ad Hoc Networks", IEEE Wireless and Mobile Computing, Networking and Communications, Jun. 19, 2006, See the whole document.

J. Chen et al., "AMNP: Ad Hoc Multichannel Negotiation Protocol for Multihop Mobile Wireless Networks", IEEE International Conference on Communications, Jun. 20, 2004, See the whole document.

U.S. Appl. No. 12/535,574, Final Office Action, mailed Mar. 27, 2012.

U.S. Appl. No. 12/535,574, Non-Final Office Action, mailed Jun. 22, 2011.

U.S. Appl. No. 12/535,563, Non-Final Office Action, mailed Apr. 23, 2012.

* cited by examiner

SYSTEM, APPARATUS AND METHOD FOR PROACTIVELY RE-ASSESSING THE AVAILABILITY AND QUALITY OF SURROUNDING CHANNELS FOR INFRASTRUCTURE OPERATION IN WIRELESS MESH NODES

FIELD

The invention relates generally to the field of wireless device connectivity. More particularly, one or more of the embodiments of the invention relate to an apparatus and method for proactively managing connectivity and wireless channel selection between nodes formulating a wireless network.

BACKGROUND

A wireless network can provide a flexible data communication system that can either replace or extend a wired network. Using radio frequency (RF) technology, wireless networks transmit and receive data over the air through walls, ceilings and even cement structures without wired cabling. For example, a wireless local area network (WLAN) provides all the features and benefits of traditional LAN technology, such as Ethernet and Token Ring, but without the limitations of being tethered together by a cable. This provides greater freedom and increased flexibility.

Currently, a wireless network operating in accordance with the Institute of Electrical and Electronic Engineers (IEEE) 802.11 Standard (e.g., IEEE Std. 802.11a/b/g/n) may operate in infrastructure mode or ad hoc mode. As of today, most installed wireless networks are configured and operate in infrastructure mode where one or more access points (APs) are configured as interfaces for a wired distribution network (e.g., Ethernet). In infrastructure mode, mobile devices with wireless connectivity (e.g., laptop computer with a radio network interface card "NIC") are able to establish communications and associate with the AP, and thus, the users of these devices are able to access content within servers connected to the wired network.

As an optional feature, however, the IEEE 802.11 Standard specifies ad hoc mode, which allows the radio NIC within each wireless device to operate in an independent basic service set (IBSS) network configuration. Hence, the wireless devices perform peer-to-peer communications with each other instead of utilizing the AP for supporting such wireless communications.

One type of ad hoc network is referred to as a mesh network, which allows for continuous connections and reconfiguration around broken or blocked paths by "hopping" from device to another device until the destination is reached. Mesh networks differ from other networks in that the devices can all connect to each other via multiple hops without infrastructure (e.g., wired APs), and these devices can be mobile or stationary. Related to mesh networks, mobile ad-hoc networks (MA-NETs) are self-configuring networks of mobile routers, where the routers are free to relocate.

One of the primary advantages of conventional mesh networks is their inability to effectively manage connectivity with mobile devices so as to minimize interference. Currently, channel selection for mesh networks is accomplished by a network administrator or home user physically visiting each AP and selecting a wireless communication channel for that AP. In some situations, this decision is based on traffic volume for that channel (e.g., traffic associated with the other APs) in order to achieve better load balancing. Unfortunately, the conventional channel selection process does not effectively minimize interference because it does not automatically adjust for changes in the system configuration. Hence, the conventional channel selection process does not hinder likelihood of neighboring nodes, which are separated by a single hop, having non-overlapping wireless channels (e.g., channels with frequency bands that do not overlap). Hence, there is a need for a system and mechanism to provide optimized, automatic non-overlapping channel selection for nodes operating in infrastructure mode.

BRIEF DESCRIPTION OF THE DRAWINGS

Embodiments of the present invention are illustrated by way of example, and not by way of limitation, in the figures of the accompanying drawings and in which.

DETAILED DESCRIPTION

In the following description, for the purposes of explanation, numerous specific details are set forth in order to provide a thorough understanding of the present invention. It will be apparent; however, to one skilled in the art that present invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. For instance, the invention may be applicable for networks operating in accordance with any IEEE 802.11 Standard (e.g. IEEE 802.11 a/b/g/n/ . . . ) as well as other standards (e.g., HiperLAN) or proprietary communication protocols supporting wireless communications with non-overlapping channels. In some instances, well-known structures and devices are not shown in block diagram form in order to avoid obscuring the details of the disclosed features of various described embodiments.

System Architecture

In the following description, certain terminology is used to describe certain features of the invention. For instance, the term "node" is generally defined as an electronic device with data processing capability and perhaps wireless communication capabilities. An ad hoc network may be formulated as "OEM-specific," meaning that access is restricted to those wireless nodes that are manufactured and/or endorsed and/or sold by the same entity or a group of entities. For instance, an example of an OEM-specific wireless mesh network (WMN) is a network that comprises a Sony® BRAVIA® digital television in communications with a Sony® Playstation® game console, a Sony® VAIO® computer, a Sony® handheld device, or any of Sony® based products with networking capability.

Herein, there are two general types of nodes. A first type is a "mesh node" that is specifically adapted to join and become a member of an OEM-specific ad hoc network such as an OEM-specific WMN. The second type is a "non-mesh node" that is only able gain access to an OEM-specific WMN indirectly through a mesh node. Such access may be through wireless or wired communications. For the scope of this invention, unless indicated otherwise, the term "node" shall constitute either a "mesh" or "non-mesh" node and the terms "WMN" or "WM network" shall constitute any type of ad hoc network.

The terms "logic" and "logic unit" are generally defined as hardware and/or software configured to perform one or more functions. One example of a certain type of logic is a radio network interface card (NIC) that features a wireless chipset being one or more integrated circuits operating to transmit and/or receive signals in order to access a wireless network initiated through an association message. "Software" is generally describes as a series of executable instructions in the form of an application, an applet, or even a routine. The software may be stored in any type of machine readable medium such as a programmable electronic circuit, a semiconductor memory device such as volatile memory (e.g., random access memory, etc.) and/or non-volatile memory such as any type of read-only memory (ROM) or flash memory, a portable storage medium (e.g., USB drive, optical disc, digital tape), or the like.

The term "message" represents information configured for transmission over a network. One type of message is a frame that is generally defined as a group of bits of information collectively operating as a single data unit. The term "content" represents video, audio, images, data, or any combination thereof.

Figure 1:
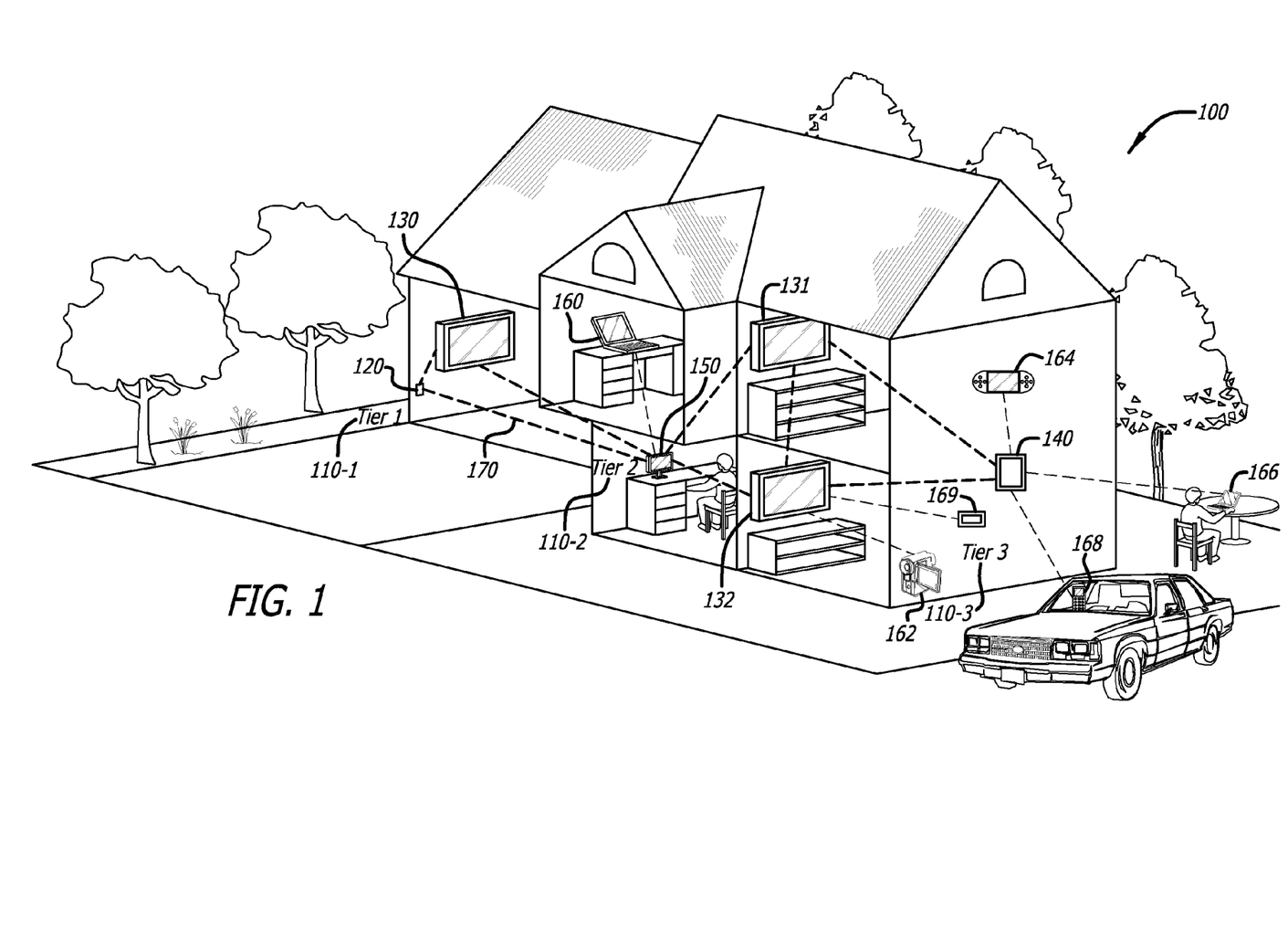
FIG. 1 is a block diagram illustrating an embodiment of a three-tier wireless ad hoc mesh network.

Referring to FIG. 1, an exemplary embodiment of a multi-tier wireless mesh network 100 is described. Multi-tier wireless mesh network (hereinafter referred to as "WMN" or "WM network") 100 comprises a collection of nodes that operate as a decentralized, wireless mesh network with multiple (M≧1) sub-networks $110_1$-$110_M$ (hereinafter singularly referred to as "tiers"). Mostly every node of WM network 100 is configured to forward data to other nodes and is assigned to a specific tier based on its performance capabilities and power constraints. The assignment of a node to a tier is a decision based at least partially on performance capabilities of the node, whereas routing decisions are made by the nodes based on the network connectivity and the ability to forward data by that particular node.

For instance, one embodiment of WM network 100 features a hierarchical architecture comprising three (3) tiers that are assigned based on the capabilities of the OEM-specific node. A first tier ("tier-1") $110_1$ is responsible for establishing and controlling access to an external network such as the Internet. For example, first tier $110_1$ may resemble a traditional Internet connection via a cable or direct subscriber line (DSL) connection or 3G/WiMax/Outdoor mesh. As illustrated, first tier $110_1$ comprises a first node 120, which is commonly referred to as a "gateway node." Gateway node 120 may include, but is not limited or restricted to a cable or DSL modem, a wireless router or bridge, and the like. Although not shown, multiple gateway nodes may be present within WM network 100 in order to provide multiple communication paths to external network(s).

A second tier ("tier-2") $110_2$ of WM network 100 may represent a wireless network backhaul that interconnects various stationary (fixed-location) OEM-specific wireless nodes adapted for communicating over a wireless communication medium such as, for example, radio frequency (RF) waves. As described herein, a "tier-2 node" includes, but is not limited or restricted to: a flat-panel television 130, 131, and 132, a gaming console 140, computer 150, or any other device with wireless capability that is usually stationary and electrically coupled to an alternating current (AC) power outlet. Hence, tier-2 nodes are not subject to power constraints that are usually present in mobile nodes where power usage is minimized to extend battery life between recharges.

As shown, computer 150 is adapted to operate in two modes. As a wireless mesh node, it can wirelessly communicate with other mesh nodes using the appropriate mesh protocol and be configured by users to join one existing WMN. As a non-mesh node, it can communicate with wireless non-mesh nodes with Ethernet and/or Wi-Fi network cards that are produced by a different manufacturer, to allow them accessing WM network 100 using the standard IEEE 802.11 or Ethernet protocol. Effectively, it enables a non-mesh node access to contents and resources on WM network 100. For instance, flat-panel television 131 may use its Wi-Fi radio operating in accordance with a selected communication protocol (e.g., IEEE 802.11a/b/g/n; HiperLAN, etc.) to associate with computer 150 and effectively access WM network 100. Also, computer 150 allows wired non-mesh nodes to associate with and join WM network 100. Although not shown, a wired non-mesh node (e.g., facsimile machine) can connect to computer 150 by using a standard Ethernet cable. In both cases, such connectivity may be accomplished without any additional hardware or software modification.

In order to maintain a simple architecture and to ease roaming, it is contemplated that tier-2 nodes operating as APs use the same network identification (SSID) and security profile (e.g., a saved group of security settings such as Wi-Fi Protected Access "WPA", Temporal Key Integrity Protocol "TKIP", etc.). This will greatly assist AP discovery when a tier-3 node runs an active scan to discover better quality (e.g., stronger signal) APs. The result of active scan can be quickly processed by ignoring networks that have a different SSID or security profile.

Referring still to FIG. 1, a third tier ("tier-3") $110_3$ of WM network 100 may include links between a node belonging to second tier $110_2$ and one or more tier-3 nodes (160, 162, 164, 166, 168 & 169). A "tier-3 node" may be any battery powered electronics device with wireless connectivity including, but not limited or restricted to a laptop computer, portable handheld device (e.g., personal digital assistant, ultra mobile device, cellular phone, portable media player, wireless camera, remote control, etc.) or any non-stationary consumer electronics devices. Since tier-3 nodes normally have resource constraints (e.g., limited power supplies, limited processing speeds, limited memory, etc.), third tier $110_3$ may provide reduced network services. In one embodiment, tier-3 nodes of WM network 100 may act as a slave or child connecting directly to a tier-2 node, which may further limit their functionality within WM network 100.

Since the traffic on backhaul 170 may include high-definition (HD) video, audio clips and video clips, as well as user data, radio NICs may be incorporated within some of the stationary nodes of the WM network 100. For example, by multiplexing a flow of compressed HD video, multiple Internet video sessions, multiple audio/video sessions and some intermittent http data traffic, the load on backhaul link 170 could reach approximately 60 megabits per second for TCP/UDP type traffic, which may require at least 100 megabits per second of raw radio support considering media access control (MAC) layer efficiency. According to this example, the tier-2 nodes might require an 802.11n type radio (e.g., at 5 GHz band) to meet such bandwidth requirements.

Figure 2A:
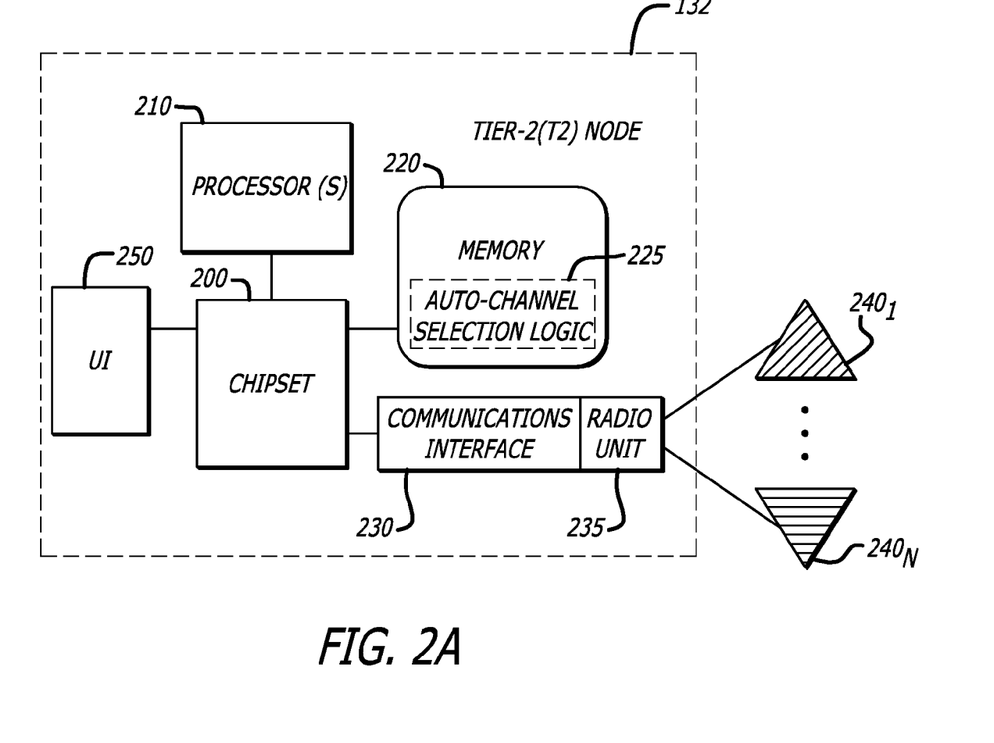
FIG. 2A is a block diagram illustrating a first embodiment of a mesh tier-2 node within the network of FIG. 1.

Referring to FIG. 2A, a first exemplary embodiment of a tier-2 node, such as tier-2 node 132 for example, is shown. Herein, tier-2 node 132 comprises an embedded wireless network chipset 200 that includes one or more processors 210, memory 220, a communications interface 230 and a user interface (UI) 250. According to this embodiment, tier-2 node 132 is adapted to operate in two modes (ad hoc & infrastructure) in a Time Division Multiple Access (TDMA) fashion using the same radio logic unit 235 deployed within communication interface 230. Radio logic unit 235 is controlled by processor 210 or dedicated circuitry (not shown) to tune and receive incoming wireless signals on a particular channel via one or more antennas $240_1$-$240_N$ ($N \geq 1$) and to transmit outgoing wireless signals to other nodes over that particular channel. Herein, processor 210 executes auto-channel selection logic 225 that is stored in memory 220 while the tier-2 nodes forming WM network 100 of FIG. 1 are operating in ad hoc mode. The tier-2 nodes negotiate their channel allocation for infrastructure mode operation using mesh communication protocol and mesh neighbor tables described below.

Figure 2B:
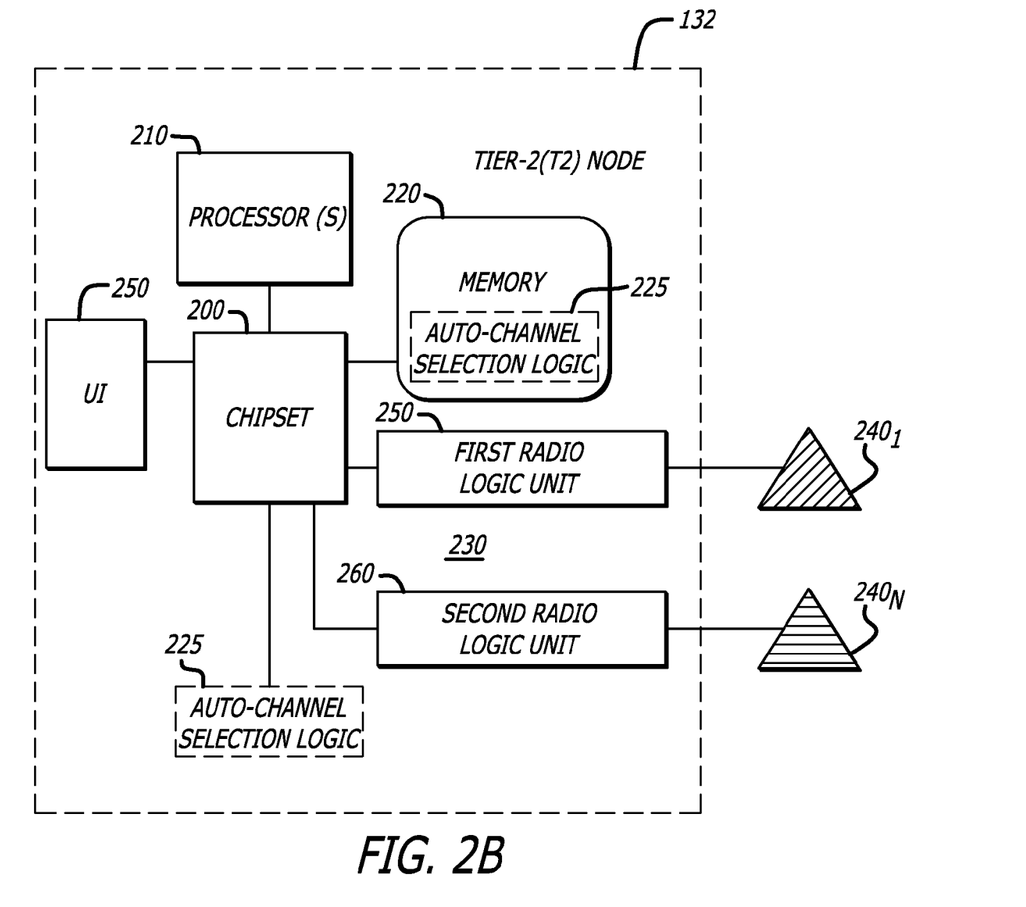
FIG. 2B is a block diagram illustrating a second embodiment of a mesh tier-2 node within the network of FIG. 1.

Referring now to FIG. 2B, a second exemplary embodiment of tier-2 node 132 is shown. Herein, tier-2 node 132 comprises a first radio logic unit 250 and a second radio logic unit 260. According to one embodiment of the invention, each of the first and second radio logic units 250 and 260 comprises either a single-band or a dual-band Wi-Fi radio which may operate on different channels from each other to avoid interference. First radio logic unit 250 and second radio logic unit 260 receive/transmit messages via antennas $240_1$ and $240_2$, respectively. Herein, first logic unit 250 enables tier-2 node 132 to operate in an ad hoc mode to negotiate channel allocation in accordance with auto-channel selection logic 225 and establish communications with ad hoc networks (between tier-2 nodes) while second logic unit 260 enables tier-2 node 132 to operate in an infrastructure mode to establish communications with wireless nodes (tier-3 nodes) scanning to associate with an access point.

Of course, it is contemplated that auto-channel selection logic 225 may be deployed as firmware or hardware within a tier-2 node. For instance, as shown by dashed lines in FIG. 2B, auto-channel selection logic 225 may be implemented as a programmable circuit in communication with chipset 200 in lieu of an executable in memory 220. The channel selection algorithm described herein allows the logic unit 260 to operate on orthogonal channels when it is in infrastructure mode.

Referring back to FIG. 1, flat panel television 132 is adapted to communicate with other tier-2 nodes (e.g., computer 150, gaming console 140, and flat panel television 131) and that is already part of WM network 100. During channel selection, flat panel television 132 can exchange data with the neighboring nodes, including a Set Channel message. Flat panel television 132 transmits a Set Channel message and receives Set Channel messages from its neighboring nodes that are separated by a single hop (e.g., computer 150, gaming console 140 and flat panel television 131) for channel selection as described below.

Figure 3:
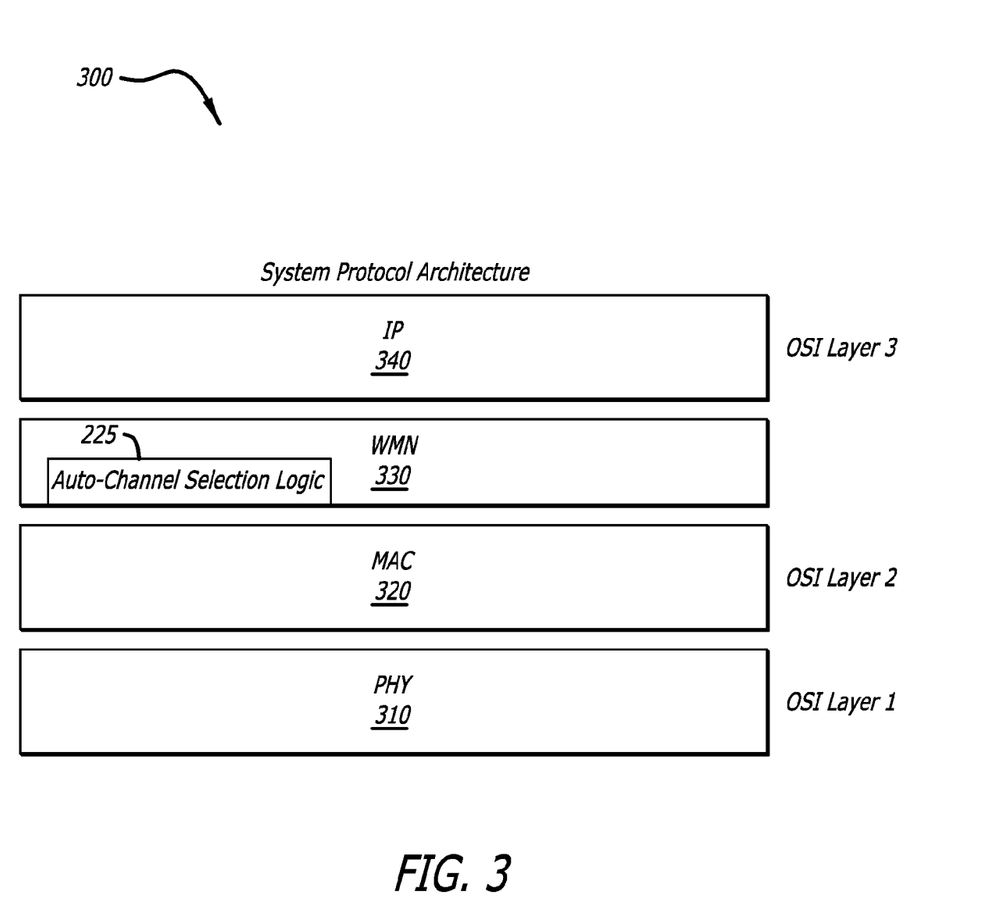
FIG. 3 is a block diagram illustrating an embodiment of a wireless mesh network protocol architecture.

As representatively shown in FIG. 3, in the protocol architecture 300 for a tier-2 node, logic associated with wireless mesh network ("WMN") functionality 330 are placed between MAC layer 320 and network (IP) layer 340 to provide a solution that is independent of the higher OSI layers deployed and can be more easily reconfigured. Hence, WMN layer 330 generally constitutes an "OSI layer 2.5" solution. The placement of WMN layer 330 provides enhanced functionality that is transparent to both lower and higher OSI layers.

In one embodiment, WMN layer 330 can perform functions directed to WMN configuration such as auto-channel selection 225 for example. According to this embodiment of the invention, auto-channel selection logic 225 is adapted to select non-overlapping channels during ad hoc mode based on signal analysis utilizing a number of parameters to discern channel availability. These parameters may include, but are not limited or restricted to the following: (1) the number of non-overlapping channels associated with the particular communication standard supported by the WM network ("$N_c$"); (2) the network degree (e.g., a count of the number of neighboring node for a particular node, "$N_d$"); 3) the MAC address of the node ("$M_{addr}$"); and (4) the number of iterations that the auto-channel selection logic has performed for this computation ("iCount").

In general, every node knows the availability and number of non-overlapping channels for the operating spectrum. When the WM network is initially formed, each node first operates in ad hoc mode on a pre-defined common channel for basic communication purposes. Each node then selects a random channel number (for its operation in future infrastructure mode) and exchanges information with its neighboring nodes, namely those nodes that is separated from that node by a single hop, to see if there is an overlap in the selected channels. The exchanged information includes $N_d$, $M_{addr}$ and iCount for the node providing such information. Each node waits to hear from all of its neighboring node(s) to determine if a collision occurs.

In the event that a collision of channel selection is detected, according to one embodiment of the invention, the node with the lower $N_d$ is designated to select a new channel, increments its iCount value and repeats the channel selection process. Selecting the node with the lower $N_d$ is conducted in order to reduce impact on the WM network as a whole. However, in the event that both colliding nodes have the same network degree, the colliding nodes compare their iCount values. The node with the lower iCount changes its channel and increments its iCount value. The higher iCount indicates that node has gone through several rounds of negotiations and it is best to keep its channel unchanged to minimize the impact on other nodes in its vicinity. In the event that both iCount and $N_d$ are the same, other parameters may be used to choose which node is to undergo channel selection again. For this embodiment, a parameter unique to each node may be used for comparison purposes such as comparison of $M_{addr}$ between the colliding nodes. Thereafter, the node with the lower $M_{addr}$ makes the decision whether to increments its iCount value and select a different channel, if another non-overlapping channel is available, or transmit a Channel Unavailable message to at least one of the other colliding node(s) as described below.

After every channel update, a node informs its neighboring nodes by broadcasting its new choice along with the $N_d$, $M_{addr}$ and iCount values. This is a 1-hop broadcast so that only immediate neighboring tier-2 nodes receive the broadcast, thereby mitigating network flooding issues. If a node's network degree is higher than $N_c$, it is guaranteed to have an overlapping channel with one of its neighboring nodes. Thus, the node will attempt to select the least interfered channel based on certain parameters, for example, the interference and noise level and/or the number of APs on that channel (or a combination of both parameters). It could as well use other parameters to make this decision in addition to or in combination with the least interference criteria. During this signal analysis, a node marks the channel that it has already been tried as "unusable" and selects a new channel from the remaining set of channels according to this particular embodiment. Accordingly, where a node is unable to find a usable channel, it sends a unicast Channel Unavailable message to each of the colliding neighboring node. Upon receiving a Channel Unavailable message from its neighboring node, the node tries to change its own channel. This channel selection after receipt of the Channel Unavailable message overrides the $N_d$, $M_{addr}$ and iCount criteria. Appropriate timeout and retry mechanisms will be implemented to account for message loss in wireless medium. In addition, proper security techniques will be used to protect message exchange between neighbors from any form of attacks.

Figure 4:
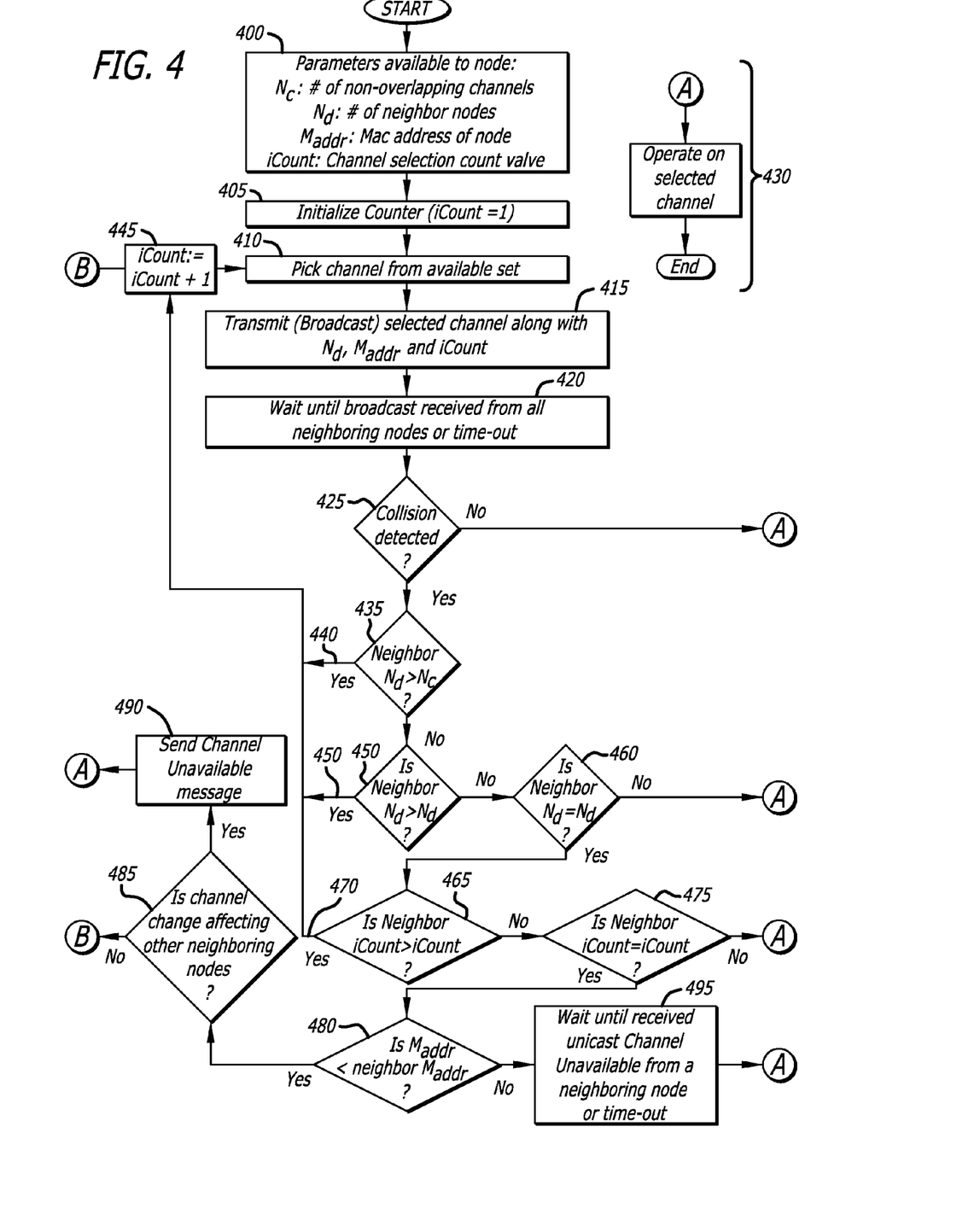
FIG. 4 is a block diagram illustrating an exemplary embodiment of operations of the auto-channel selection logic implemented within tier-2 node of FIGS. 2A & 2B.

Referring to FIG. 4, an exemplary embodiment of operations of the auto-channel selection logic implemented within a node (e.g., tier-2 node) is shown. Initially, a plurality of parameters are available to this node (referred to as the "first node") prior to determine which wireless channel to use for transmission and/or receipt of wireless signals. These parameters include (1) the number of non-overlapping channels ($N_c$); (2) network degree ($N_d$); (3) MAC address of the node ($M_{addr}$); and (4) channel selection count value (iCount) as illustrated in item 400. Thereafter, as shown in item 405, the iCount value is initialized to a start value (e.g., iCount=1) prior to selection of the wireless channels by the tier-2 node.

Herein, the first node randomly or pseudo-randomly selects a channel from a set of non-overlapping channels (item 410). Of course, the particulars associated with the non-overlapping channels may vary based on the chosen wireless communication protocol supported by the WM network and the country of deployment. For illustrative purposes, in accordance with IEEE 802.11(b) standard practiced in the United States, there are eleven (11) channels of which, due to the proximity of their frequency bands, channels 1, 6 and 11 are considered to be non-overlapping channels. In accordance with HiperLAN/x or proprietary communication protocols, the set of non-overlapping channels may be differ from the channels (Ch1, Ch6 & Ch11) used for illustrative purposes.

Once the first node selects a particular channel, as set forth in item 415, a Set Channel message is transmitted in accordance with a WMN communication protocol. The Set Channel message includes the selected channel number along with the network degree ($N_d$), selection count value (iCount) and MAC address ($M_{addr}$) parameters associated with the first node as described below. These parameters may be referred to as "self $N_d$"; "self iCount"; and "self $M_{addr}$".

Figure 5:
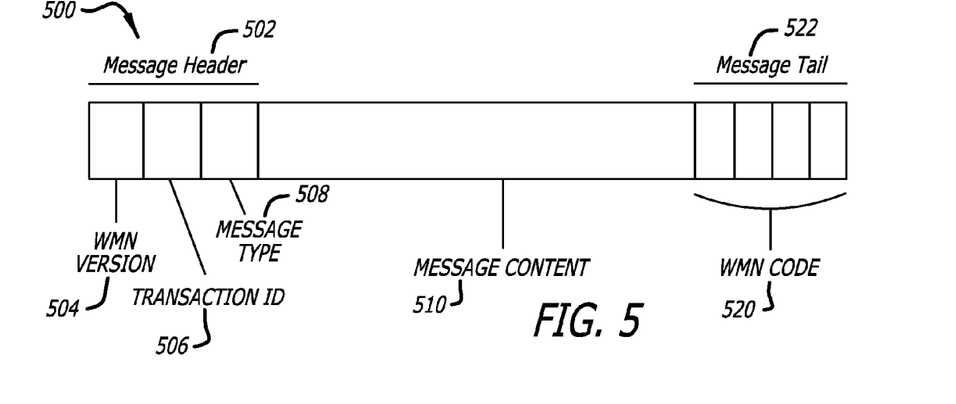
FIG. 5 illustrates a generic WMN message packet format according to one embodiment of the invention.

FIG. 5 illustrates an exemplary format of a WMN message 500, which is representative of a messaging format that nodes use for communications with other nodes within WHM network 100 of FIG. 1. More specifically, as shown in FIG. 5 as an illustrative embodiment, WMN message 500 comprises (i) a message header 502, (ii) message content 510, and (iii) a message tail 520.

Herein, according to this exemplary embodiment, message header 502 includes a WMN version 504, a transaction (message) ID 506 and a type sub-field 508. WMN version 504 is configured to identify the particular version of software supporting the network connectivity. Transaction (message) ID 506 is configured to identify the particular session in which the message is being sent. This is a security mechanism to ensure that messages are not duplicated during a session. Finally, type sub-field 508 is configured to indicate a type of message. For instance, each message type for the WMN-based protocol is assigned a unique identifier to facilitate processing of the contents of the message.

Message content 510 is a portion of the message that is adapted to include data such as control information if WMN message 500 is a control message. The data may be encoded to protect the data from interlopers and to ensure that the data is accessible only by the targeted wireless node.

Message tail 520 includes a WMN (mesh) code 522. In one embodiment of the invention, each WMN message ends with a WMN code 522 that may be repeated a predetermined number of times to ensure that an entire message is received without error. If there is an error during transmission, reception or processing of the message, the mesh code received may not match the pre-determined pattern. If this occurs, the entire message is discarded. Other errors in the body of the message may be detected using standard 802.11 frame verification (e.g., CRC).

Figure 6:
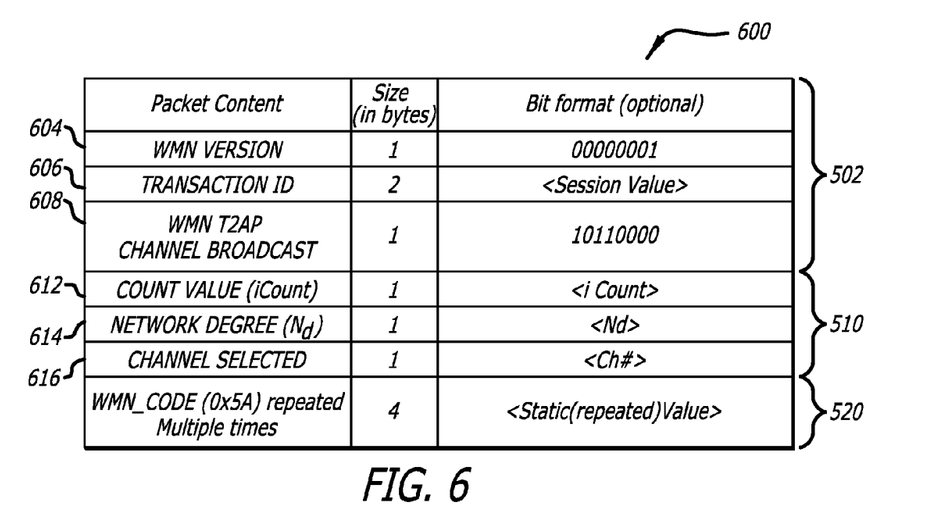
FIG. 6 illustrates an exemplary format of a Set Channel message.

FIG. 6 illustrates an exemplary format of a particular type of WMN message, namely a Set Channel message 600. Set Channel message 600 is a broadcast message that a tier-2 node sends out upon selection of a wireless channel for communications during ad hoc mode and prior to operation in infrastructure mode. According to one embodiment of the invention, Set Channel message 600 features (i) a WMN version sub-field 604 that identifies the particular version of software supporting the network connectivity; (ii) a Transaction ID sub-field 606 is configured to identify the particular session during transmission of this message; and (iii) a Type sub-field 608, which indicates that this message is a tier-2 channel selection message (referred to as a "T2 AP Channel Broadcast message"). In addition, the message content for Set Channel message 600 comprises a count value (iCount) 612, a network degree ($N_d$) 614 and a selected channel number 616 (e.g., channels 1, 6 or 11 for IEEE 802.11(b) as an illustrative example).

Referring back to FIG. 4, after tier-2 node transmits a Set Channel message, the first node waits until a predetermined time-out period has elapsed or receipt of Set Channel messages from its neighboring nodes (item 420). Thereafter, the first node is able to determine if a collision has occurred (item 425). According to one embodiment of the invention, the first node only considers Set Channel messages for neighboring tier-2 nodes that are separated by only a single hop. Regardless of the embodiment selected, the tier-2 node possesses and save information concerning $N_c$, its own $N_d$, iCount and $M_{addr}$ as well as each neighboring nodes' $N_d$ (Neighbor $N_d$), iCount (Neighbor iCount) and MAC address (Neighbor $M_{addr}$).

In the event that a channel collision is not detected, the first node operates on the wireless channel that it has selected (item 430). However, if a channel collision is detected, the first node determines whether it needs to re-select its wireless communication channel. This determination may be based on parameters stored within the first node. These parameters include information concerning the WM network (e.g., $N_c$), the first node ($N_d$, iCount and $M_{addr}$) as well as parameters corresponding to the neighboring nodes from which Set Channel messages were received (e.g., $N_d$ of a neighboring node "Neighbor $N_d$," iCount of a neighboring node "Neighbor iCount," and MAC address of the neighboring node "Neighbor $M_{addr}$").

For instance, according to one embodiment of the invention, as an optional feature, the first node may determine whether the neighbor $N_d$, namely the number of neighboring nodes for the neighboring node, is greater than the number of available non-overlapping channels ($N_c$) (item 435). If so, the first node re-selects a different channel from the set of non-overlapping channels with the expectation of selecting a wireless channel that minimizes interference perhaps based on interference and noise level and/or number of tier-2 (AP) nodes assigned to the particular channels (item 440). The iCount of the first node is altered (e.g., incremented) in order to monitor the number of times that the first node has re-selected its communication channel during this channel selection session (item 445).

If $N_c$ is greater than the neighbor $N_d$, the first node determines whether the Neighbor $N_d$ is greater than its $N_d$ (self $N_d$) as described in item 450. If so, the first node is responsible for re-selecting another wireless channel from the set of non-overlapping channels and incrementing its iCount value (items 445 and 455). In the event that the Neighbor $N_d$ is not greater than $N_d$, the first node determines whether the Neighbor $N_d$ is equal to $N_d$ (item 460). If not, which denotes that the first node has a higher network degree than the colliding neighboring node, the first node operates on its selected channel and the neighboring node will be responsible for re-selecting its wireless channel (item 430).

However, in the event that the Neighbor $N_d$ is equal to $N_d$, the first node conducts a second determination by comparing iCount (self iCount) with the Neighbor iCount for each of the colliding neighboring node(s) as denoted at item 465. Upon determining that Neighbor iCount is greater than iCount, the first node is responsible for re-selecting a wireless channel and incrementing iCount (items 470 and 445). In the event that the Neighbor iCount is not greater than iCount, the first node determines whether the Neighbor iCount is equal to iCount (item 475). If not, which denotes that the first node has a higher iCount value than at least one of the colliding neighboring nodes, the first node operates on its selected channel and a colliding neighboring node will be responsible for re-selecting its wireless channel (item 430). However, in the event that Neighbor iCount is equal to iCount, the first node conducts a definitive determination by conducting a comparison between unique values possessed by the colliding nodes, such as their MAC addresses (Neighbor $M_{addr}$ versus self $M_{addr}$) as denoted by item 480. In case of a node receives multiple collisions from different neighboring nodes, the priority of changing its channels will be based on the sequence of comparing $N_c$, $N_d$, iCount and $M_{addr}$.

Since each $M_{addr}$ is a unique value, a decision as to which node is responsible for reselecting its channel will be made. For this illustrative embodiment, if the $M_{addr}$ is less than the Neighbor $M_{addr}$, the first node is responsible for either re-selecting a wireless channel and incrementing iCount or sending a Channel Unavailable message if any change in channel by the first node will affect other neighboring nodes (items 485 and 490). In the event that the $M_{addr}$ is greater than Neighbor $M_{addr}$, the first node will wait until receipt of a Channel Unavailable message from a neighboring node or until a time-out period has elapsed (item 495).

Figure 7:
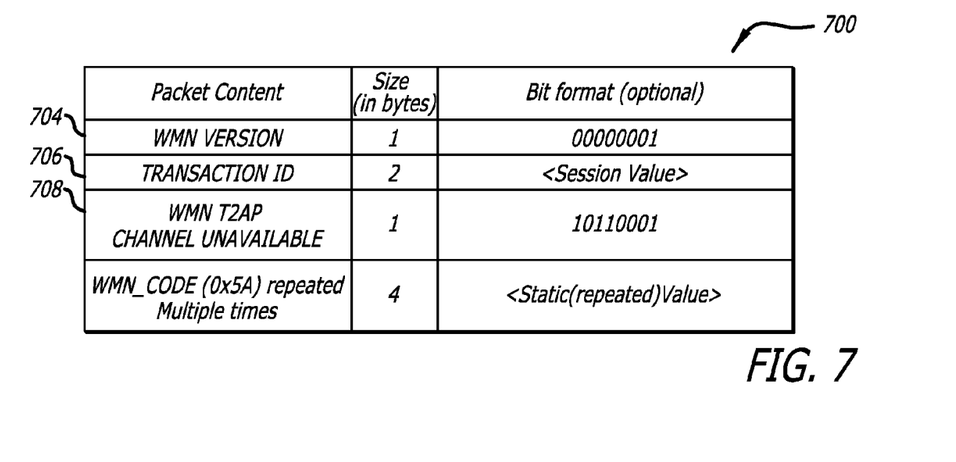
FIG. 7 illustrates an exemplary format of a Channel Unavailable message.

FIG. 7 illustrates an exemplary format of a particular type of WMN message, namely a Channel Unavailable message 700. Channel Unavailable message 700 is a unicast message that a tier-2 node sends out to a neighboring node upon determining that it cannot re-select a non-overlapping channel. According to one embodiment of the invention, Channel Unavailable message 700 features (i) a WMN version sub-field 704 that identifies the particular version of software supporting this messaging; (ii) a Transaction ID sub-field 706 is configured to identify the particular session during transmission of this message; and (iii) a Type sub-field 708, which indicates that this message is a tier-2 channel unavailable message (referred to as a "T2 AP Channel Unavailable").

Of course, it is contemplated that the analysis of the parameters may be reordered. Also, the analysis concerning the unique values for the colliding nodes may be altered so that the first node has the decision whether to re-select a channel or transmit a Channel Unavailable message if its unique value is larger that the unique value of the neighboring node, has a lesser or larger number of logical bits "1" or "0", or any defined criterion may be used.

Figure 8A:
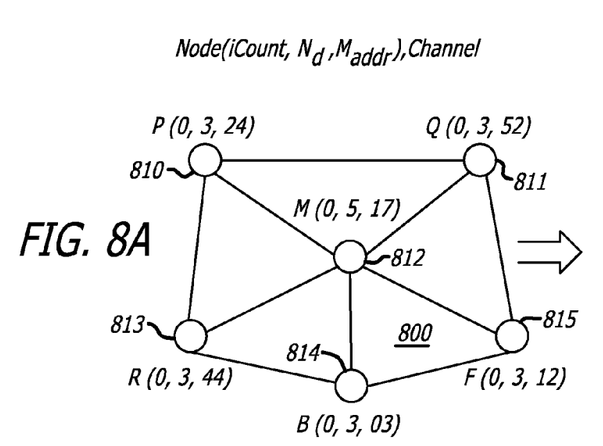
FIGS. 8A-8D illustrate a first exemplary embodiment the operations of the auto-channel selection logic.
Figure 8B:
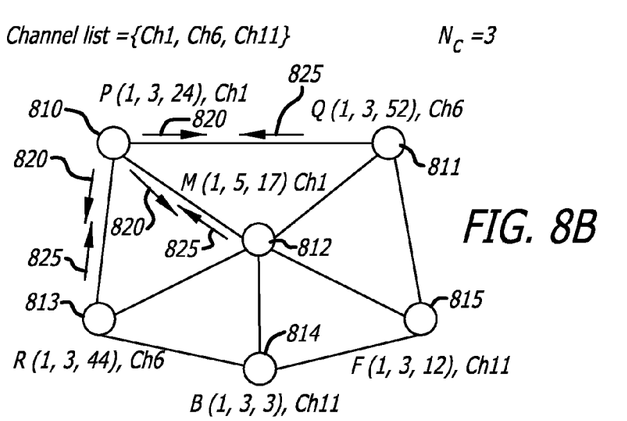

Referring now to FIGS. 8A-8D, a first exemplary embodiment to illustrate the operations of the auto-channel selection logic is shown. Herein, a condition exists where WM network 800 includes a plurality of nodes operating as APs; namely nodes 810-815. Initially, the iCount is increased for each node 810-815 and each node selects a non-overlapping wireless channel as shown in FIG. 8B. Normally, this initial channel selection is random or pseudo-random in nature. Herein, according to this illustrative embodiment, nodes 810 and 812 select a first channel (Ch1) while nodes 811 and 813 select a second channel (Ch6). Nodes 814 and 815 selected a third channel (Ch11).

Node 810 transmits a Set Channel message 820 to each of its neighboring nodes, namely nodes 811, 812 and 813 and receives messages 825 from these nodes. Messages 825 may be any message in response to Set Channel messages 820 or separate Set Channel messages, provided that these messages include information concerning the network degree ($N_d$), count (iCount) and MAC addressing ($M_{addr}$) for the transmitting neighboring node. Upon the exchange of messages 820 and 825, node 810 determines that a channel collision has occurred with neighboring node 812. Thus, node 810 determines if $N_d$ of neighboring node 812 is greater than $N_d$ (Neighbor $N_d$=5>$N_d$=3). Since $N_d$ is less than Neighbor $N_d$, node 810 alters iCount (e.g., incremented for this embodiment) and selects another non-overlapping channel such as the third channel (Ch11). Thereafter, node 810 transmits a second set of Set Channel message 830 as shown in FIG. 8C.

Figure 8C:
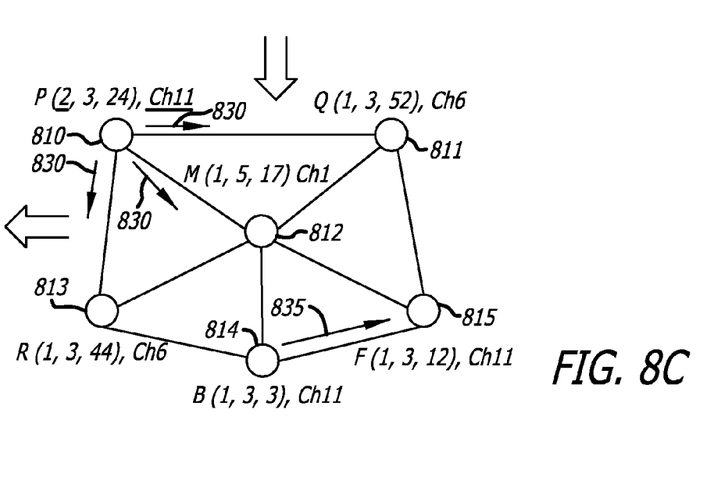

Referring now to FIG. 8C, node 814 has received Set Channel messages from each of its neighboring nodes, and based on this information, it has determined that there is a collision with node 815. However, since both nodes have identical $N_d$ and iCount values, node 814 is responsible for determining whether to re-select another non-overlapping channel or issue a Channel Unavailable message since it has a lower $M_{addr}$. However, node 814 determines that there are no non-overlapping channels available. As shown, node 812 uses the first channel (Ch1), node 813 uses the second channel (Ch6) and node 814 uses the third channel (Ch11). As a result, node 814 transmits a Channel Unavailable message to node 815.

Figure 8D:
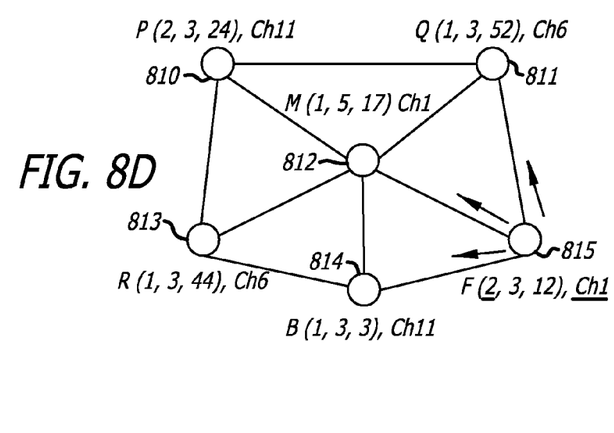

Referring now to FIG. 8D, upon receipt of Channel Unavailable message from node 814, node 815 increments its iCount value, selects a new channel (e.g., first channel "Ch1"). The channel selection is based on environmental and signal analysis (e.g., load, signal strength, etc.). During the process of channel selection, node 815 is aware that due to node 812's high network degree, it will not be possible to avoid a channel collision with it.

Figure 9A:
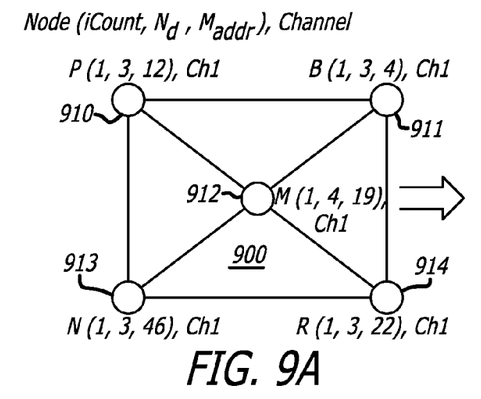
FIGS. 9A-9C illustrate a second exemplary embodiment the operations of the auto-channel selection logic.
Figure 9B:
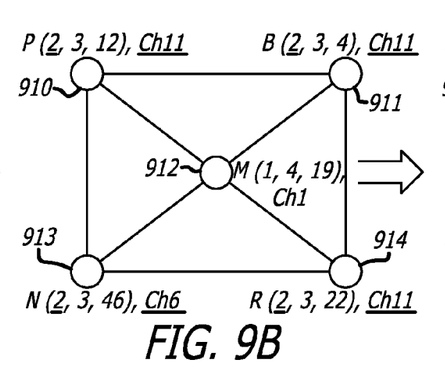

Referring now to FIGS. 9A-9C, a second exemplary embodiment to illustrate the operations of the auto-channel selection logic is shown. Herein, WM network 900 includes a plurality of nodes operating as APs; namely nodes 910-914. Initially, the iCount is increased for each node 910-914 and each node selects a non-overlapping wireless channel as shown in FIG. 9A. Herein, each of nodes 910-914 has selected a first channel (Ch1). Since node 912 has the highest network degree ($N_d=4$), all other nodes 910-911 and 913-914 increment their iCount and select a different non-overlapping channel as shown in FIG. 9B.

Figure 9C:
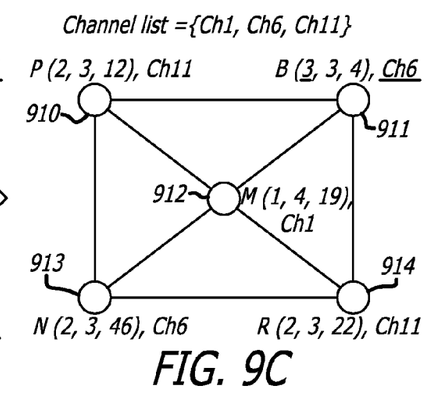

In FIG. 9B, node 913 selects the second non-overlapping channel (Ch6) while nodes 910-911 and 914 select the third non-overlapping channel (Ch11) and transmit a second set of Set Channel messages. Upon receipt of the messages from neighboring nodes 910 and 914 and determining that these nodes have identical $N_d$ and iCount values, node 911 determines that it has the lowest $M_{addr}$, and thus, increments its iCount and selects another non-overlapping channel that has not been selected previously, namely the second overlapping channel (Ch6) as shown in FIG. 9C. Thereafter, no further collisions are detected and the wireless channels for the tier-2 nodes within the WM network are established.

Figure 10A:
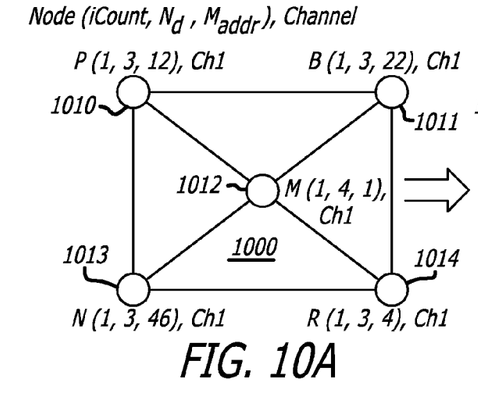
FIGS. 10A-10C illustrate a third exemplary embodiment the operations of the auto-channel selection logic.
Figure 10B:
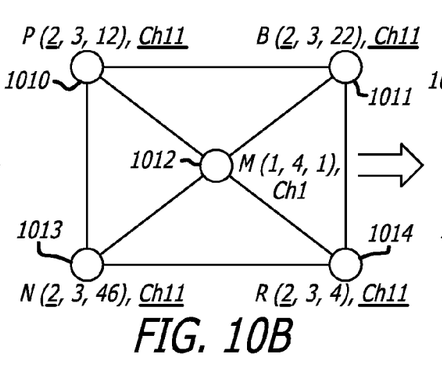

Referring now to FIGS. 10A-10C, a third exemplary embodiment to illustrate the operations of the auto-channel selection logic is shown. Herein, WM network 1000 includes a plurality of nodes operating as APs; namely nodes 1010-1014. Initially, the iCount is increased for each node 1010-1014 and each node selects a non-overlapping wireless channel as shown in FIG. 10A. Herein, nodes 1010-1014 select a first channel (Ch1). Since node 1012 has the highest network degree ($N_d$), all other nodes 1010-1011 and 1013-1014 increment their iCount and select a different non-overlapping channel as shown in FIG. 10B.

Figure 10C:
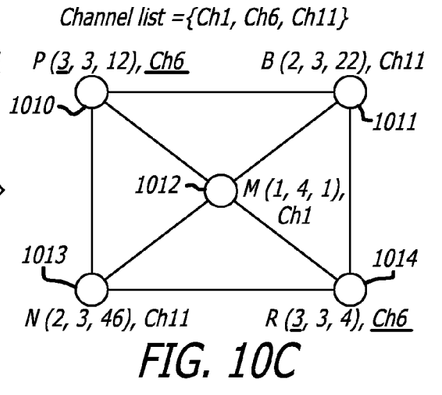

In FIG. 10B, each of nodes 1010-1011 and 1013-1014 selects the third non-overlapping channel (Ch11) and re-transmit a second set of Set Channel messages. Upon receipt of the messages from their neighboring nodes, all of nodes 1010-1011 and 1013-1014 have the same $N_d$ and iCount values. However, nodes 1010 and 1014 have the lower $M_{addr}$ among their neighboring nodes, and thus, both nodes 1010 and 1014 increment their iCount values and select yet another different non-overlapping channel, namely the second overlapping channel (Ch6) as shown in FIG. 1C. Thereafter, no further collisions are detected and the wireless channels for the tier-2 nodes within the WM network are established.

Figure 11A:
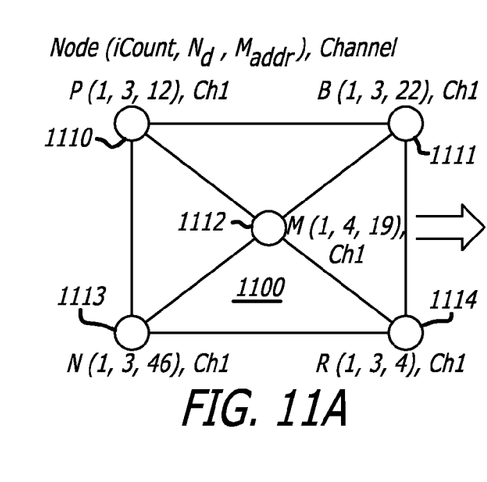
FIGS. 11A-11C illustrate a fourth exemplary embodiment the operations of the auto-channel selection logic.
Figure 11B:
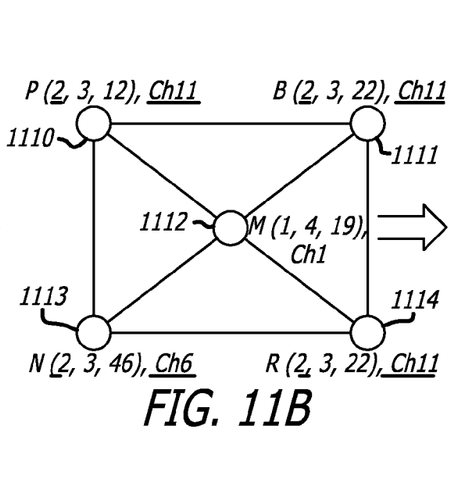

Referring to FIGS. 11A-11C, a fourth exemplary embodiment to illustrate the operations of the auto-channel selection logic is shown. Herein, WM network 1100 includes a plurality of nodes operating as APs; namely nodes 1110-1114. Initially, the iCount is increased for each node 1110-1114 and each node selects a non-overlapping wireless channel as shown in FIG. 11A. Herein, nodes 1110-1114 select a first channel (Ch1). Since node 1112 has the highest network degree ($N_d$), all other nodes 1110-1111 and 1113-1114 increment their iCount and select a different non-overlapping channel as shown in FIG. 11B.

In FIG. 11B, nodes 1113 selects the second non-overlapping channel (Ch6) while nodes 1110-1111 and 1114 select the third non-overlapping channel (Ch11). All of these nodes re-transmit a second group of Set Channel messages to their neighboring nodes. Upon receipt of the second group of Set Channel messages, nodes 1110 and 1114 determine that their neighboring nodes have the same $N_d$ and iCount values, but they have a lower $M_{addr}$ than node 1111. Thus, since nodes 1110 and 1114 are unable to select a non-overlapping channel that does not collide with a channel already known to be used by a neighboring node, nodes 1110 and 1114 transmit a Channel Unavailable message to node 1111.

Figure 11C:
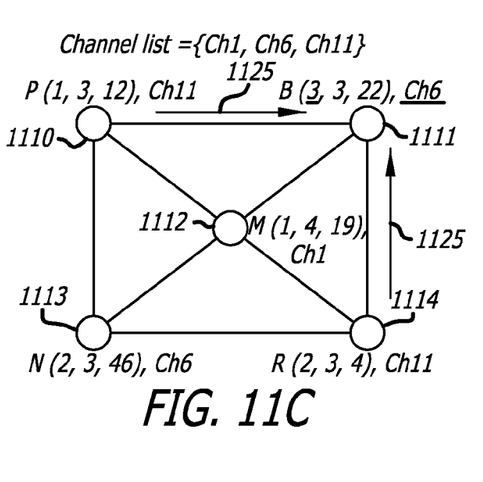

Upon receipt of Channel Unavailable message from node 1110 and 1014, node 1111 increments its iCount value, selects a new non-overlapping channel (e.g., first channel "Ch6"). Thereafter, no further collisions are detected and the wireless channels for the tier-2 nodes within the WM network are established.

Having disclosed exemplary embodiments and the best mode, modifications and variations may be made to the disclosed embodiments while remaining within the scope of the embodiments of the invention as defined by the following claims.

What is claimed is:

1. A method for selecting a wireless channel for a first wireless node of a plurality of wireless nodes forming a wireless mesh network, the method comprising:
   receiving information from at least one neighboring node;
   determining if a collision has occurred between the first wireless node and the at least one neighboring node, the collision being an overlapping of wireless channels selected by the first wireless node and the at least one neighboring node;
   comparing a network degree of the neighboring node with a network degree of the first wireless node if the collision has occurred;
   comparing a count value of the first wireless node with a count value of the at least one neighboring node if the network degree of the first wireless node is equal to the network degree of the at least one neighboring node, wherein
      the count value of the first wireless node representing a number of iterative times that the first wireless node has re-selected different wireless channels during a network configuration, and
      the count value of the at least one neighboring node representing a number of iterative times that the at least one neighboring node has re-selected different wireless channels during the network configuration; and
   selecting which of the first wireless node or the at least one neighboring node is responsible for re-selecting a different wireless channel from a set of non-overlapping wireless channels that are available to the wireless mesh network based on a comparison of the count value of the first wireless node and the count value of the at least one neighboring node.

2. The method of claim 1, wherein the first wireless node and the at least one neighboring node are tier-2 nodes being electronic devices with wireless capability and adapted to receive alternating current power.

3. The method of claim 2, wherein one of the first wireless node and the at least one neighboring node is a flat panel television.

4. The method of claim 1, wherein the first wireless node to re-select the different wireless channel from the set of non-overlapping wireless channels if the network degree of the first wireless node is less than the network degree of the at least one neighboring node.

5. The method of claim 1, wherein the receiving of the information comprises:
   transmitting a first message by the first wireless node, the first message comprises the network degree of the first wireless node; and
   receiving a second message from the at least one neighboring node, the second message comprises the network degree of the at least one neighboring node.

6. The method of claim 1, wherein the receiving of the information comprises:
   transmitting the first message by the first wireless node, the first message comprises the network degree of the first wireless node and the count value of the first wireless node; and
   receiving the second message from the at least one neighboring node, the second message comprises the network degree of the at least one neighboring node and the count value of the at least one neighboring node.

7. The method of claim 1 further comprising:
   comparing a unique identifier for the first wireless node with a unique identifier corresponding to the at least one neighboring node if both (i) the network degree of the first wireless node is equal to the network degree of the at least one neighboring node, and (ii) the count value of the first wireless node is equal to the count value of the at least one neighboring node,
   selecting which of the first wireless node or the at least one neighboring node is responsible for re-selecting the different wireless channel based on a comparison between the unique identifier of the first wireless node and the unique identifier value of the at least one neighboring node.

8. The method of claim 7, wherein the unique identifier of the first wireless node is a media access control (MAC) address of the first wireless node and the unique identifier of the at least one neighboring node is a media access control (MAC) address of the at least one neighboring node.

9. The method of claim 8, wherein the selecting includes a selecting of the first wireless node if the MAC address of the first wireless node is less than the MAC address of the at least one neighboring node.

10. The method of claim 9, wherein the first wireless node transmitting a Channel Unavailable message to the at least one neighboring node if another wireless non-overlapping channel cannot be selected by the first wireless node without causing another collision with a different neighboring node.

11. The method of claim 8, wherein the selecting includes a selecting of the first wireless node if the MAC address of the first wireless node is greater than the MAC address of the at least one neighboring node.

12. A software stored within a memory and executed by a processor implemented within a first node being an electronic device with data processing capability and wireless communication capabilities, to perform the operations of:
   receiving information from at least one neighboring node;
   determining if a collision has occurred with the at least one neighboring node, the collision being an overlapping of wireless channels selected by the first node and the at least one neighboring node;
   comparing a network degree of the neighboring node with a network degree of the first node to determine which of the first node or the at least one neighboring node is responsible for re-selecting a different wireless channel from a set of non-overlapping wireless channels that are available to the wireless mesh network;
   comparing a count value of the first node with a count value of the at least one neighboring node if the network degree of the first node is equal to the network degree of the at least one neighboring node, wherein
      the count value of the first node representing a number of iterative times that the first node has re-selected different wireless channels during a network configuration, and
      the count value of the at least one neighboring node representing a number of iterative times that the at least one neighboring node has re-selected different wireless channels during the network configuration; and
   re-selecting the different wireless channel if the count value of the first node is less than the count value of the at least one neighboring node.

13. The software of claim 12, wherein the software to re-select the different wireless channel from the set of non-overlapping wireless channels is executed if the network degree of the first node is less than the network degree of the at least one neighboring node.

14. The software of claim 12 being executed by the processor to perform further operations:
   comparing a unique identifier for the first node with a unique identifier corresponding to the at least one neighboring node if both (i) the network degree of the first node is equal to the network degree of the at least one neighboring node, and (ii) the count value of the first node is equal to the count value of the at least one neighboring node,
   re-selecting the different wireless channel if the unique identifier of the first node is less than the unique identifier value of the at least one neighboring node.

15. The software of claim 14, wherein the unique identifier of the first node being a media access control (MAC) address.

16. The software of claim 12 being executed by the processor to perform further operations:
   comparing a unique identifier for the first node with a unique identifier corresponding to the at least one neighboring node if both (i) the network degree of the first node is equal to the network degree of the at least one neighboring node, and (ii) the count value of the first node is equal to the count value of the at least one neighboring node; and
   re-selecting the different wireless channel if the unique identifier of the first node is greater than the unique identifier value of the at least one neighboring node.

17. The software of claim 12 being executed by the processor to perform further operation:
   transmitting a message to the at least one neighboring node if another wireless non-overlapping channel cannot be selected by the first node without causing another collision with a different neighboring node.

18. An electronic device being part of a wireless network including at least one neighboring node, the electronic device comprising:
   a first logic unit to receive information from at least one neighboring node;
   a processor coupled to the first logic unit, the processor to (i) determine if a collision has occurred with the at least one neighboring node, the collision being an overlapping of wireless channels selected by the electronic device and the at least one neighboring node, (ii) compare a network degree with a network degree of the at least one neighboring node, (iii) compare a count value of the first node with a count value of the at least one neighboring node if the network degree of the first node is equal to the network degree of the at least one neighboring node, wherein the count value of the first node representing a number of iterative times that the first node has re-selected different wireless channels during a network configuration, and the count value of the at least one neighboring node representing a number of iterative times that the at least one neighboring node has re-selected different wireless channels during the network configuration, (iv) if the electronic device is responsible for re-selecting a different wireless channel from a set of non-overlapping wireless channels that are available to the wireless mesh network based at least in part on a comparison of the network degree with the network degree of the at least one neighboring node, and (v) re-selecting the different wireless channel if the count value of the first node is less than the count value of the at least one neighboring node.

* * * * *